United States Patent [19]

Kirnbauer et al.

[11] Patent Number: 5,443,735
[45] Date of Patent: Aug. 22, 1995

[54] METHOD AND DEVICE FOR INHIBITING BACTERIAL GROWTH ON SORBENT MEDIA

[75] Inventors: Erwin Kirnbauer, Lattingtown; Donald H. White, Jr., Honec, both of N.Y.; Joseph D. Adiletta, Thompson, Conn.

[73] Assignee: Pall Corporation, East Hills, N.Y.

[21] Appl. No.: 118,998

[22] Filed: Sep. 9, 1993

Related U.S. Application Data

[63] Continuation of Ser. No. 758,682, Sep. 12, 1991, abandoned.

[51] Int. Cl.[6] .................................................. C02F 9/00
[52] U.S. Cl. .................................. 210/668; 210/679; 210/694; 210/764; 210/266; 210/282; 210/501; 210/502.1; 210/504; 210/505; 210/510.1; 264/122
[58] Field of Search .............. 210/668, 669, 764, 282, 210/502.1, 503–505, 510.1, 679, 694, 266, 501; 264/122

[56] References Cited

U.S. PATENT DOCUMENTS

| 2,087,157 | 7/1937 | Lind | 210/282 |
| 2,749,307 | 6/1956 | Ellison | 210/282 |
| 3,327,859 | 6/1967 | Pall | 210/266 |
| 4,642,192 | 2/1987 | Heskett | 210/763 |
| 4,992,170 | 2/1991 | Menon et al. | 210/321.78 |
| 5,149,437 | 9/1992 | Wilkinson et al. | 210/757 |

OTHER PUBLICATIONS

Hydro Life Corporation Drawing, dated Apr. 27, 1989.

*Primary Examiner*—Ivars Cintins
*Attorney, Agent, or Firm*—Leydig, Voit & Mayer, Ltd.

[57] ABSTRACT

A method for inhibiting the growth of microorganisms on sorbents selected from the group consisting of absorbents and adsorbents that are susceptible to undesirable microorganism growth when exposed to water containing such organisms, said method comprising passing water to be treated by said sorbent over brass particles prior to or concurrently with contacting said sorbent with said water, the contact with the brass particles being sufficient to inhibit the growth of microorganisms on said sorbent while not releasing more than 1 ppmw copper ions and 5 ppmw zinc ions into the effluent water. Also disclosed are related sorbent elements and pretreatment packets used in said method.

32 Claims, 1 Drawing Sheet

U.S. Patent     Aug. 22, 1995     5,443,735
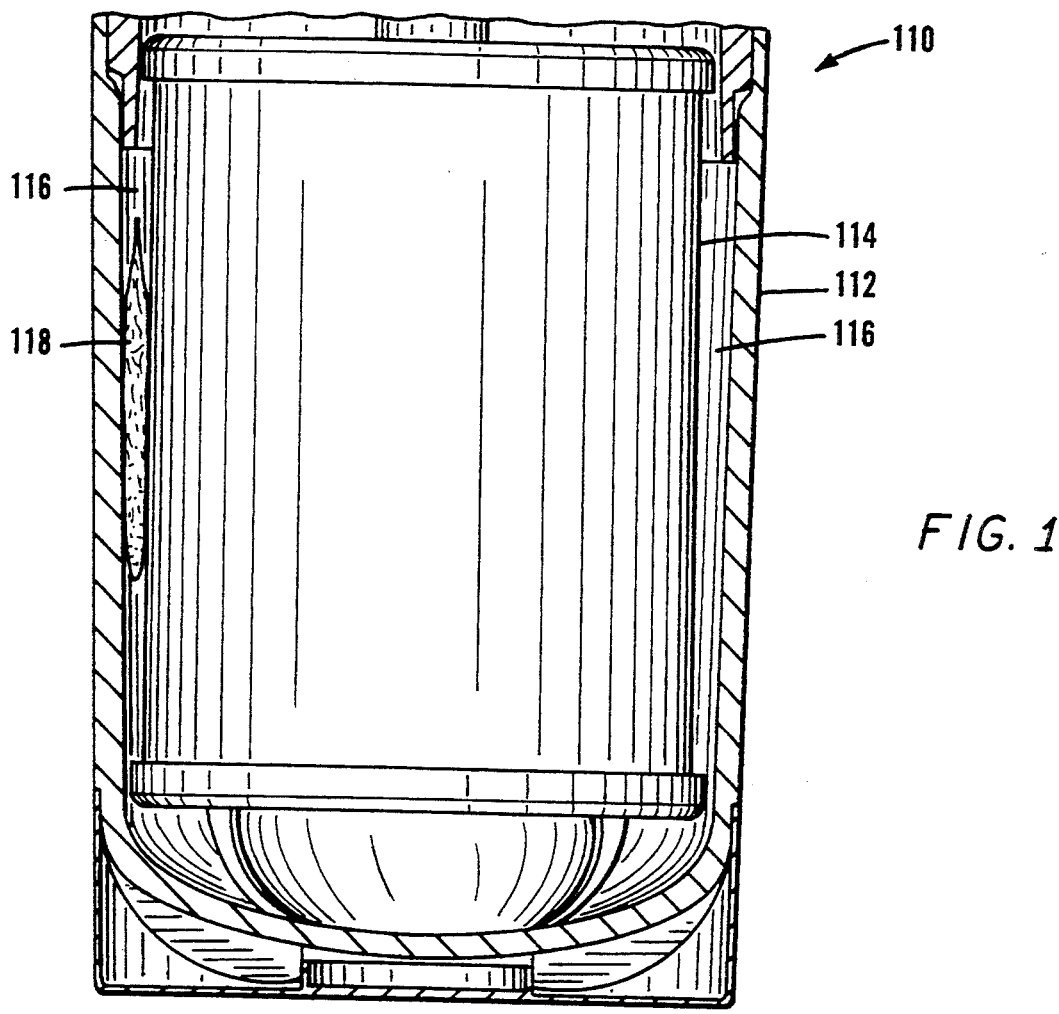
FIG. 1
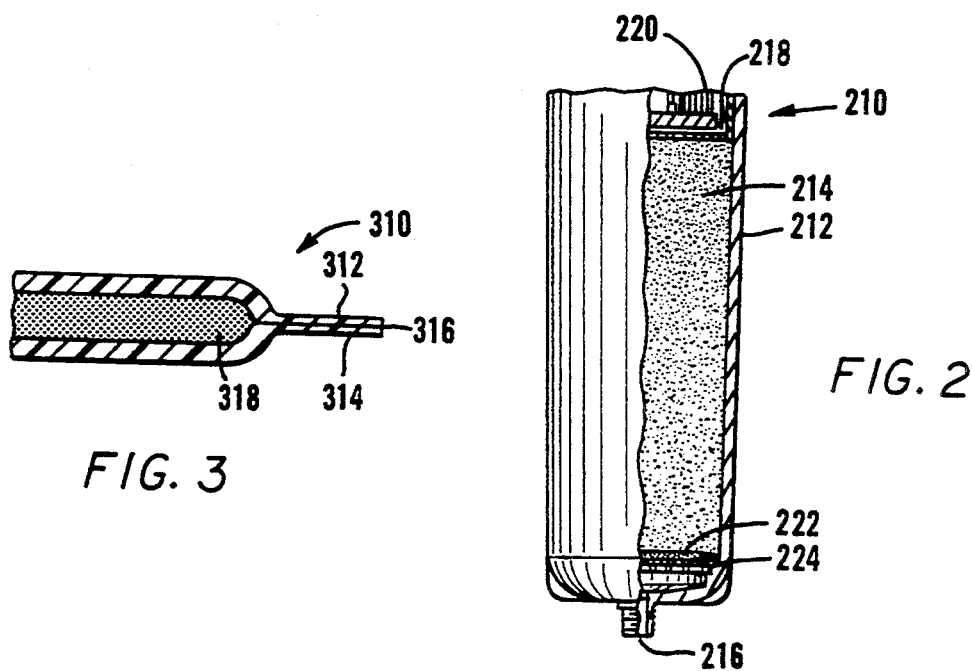
FIG. 2
FIG. 3

METHOD AND DEVICE FOR INHIBITING BACTERIAL GROWTH ON SORBENT MEDIA

This is a continuation of application Ser. No. 07/758,682 filed on Sep. 12, 1991, now abandoned.

FIELD OF THE INVENTION

This application relates to water purification, generally, and more particularly to water purification sorbents and related devices and methods used to improve the quality of potable water.

BACKGROUND OF THE INVENTION

As the quality of the world's water supply continues to decline, even in developed nations, due to increased man-made contaminants, the need to purify the water for drinking at the point of consumption, such as the home, is also dramatically increasing. Because of the types of contaminants found in today's water supply, such as pesticides, fertilizers, chemical solvents, and the like, one of the most effective ways of removing the same is by adsorbing or absorbing the contaminant by use of a sorbent bed through which the water is passed. Typical sorbent beds are made of activated carbonaceous material. Such activated carbon beds may be used in conjunction with a filtration medium, used to remove bacterial and microbial contamination from the water.

In most point-of-use water purification systems the sorbent bed is maintained in contact with residual water left in the system after each use. Further, typical sorbent media, and some filtration media, provide very good sites for microorganisms to accumulate and grow. The damp sorbent bed with its entrained contaminants can act as an ideal environment for colonization of microorganisms. Such microorganism growth can lead to very undesirable results.

The very water that is to be purified, may now be contaminated by the sorbent bed in the purification system. Further, the growth of the microorganisms is usually associated with the evolution of undesirable by-products, such as gaseous hydrogen sulfide, typically recognized by its "rotten-egg" odor. The presence of such by-products in potable water diminishes its aesthetic quality.

A problem has therefore arisen due to the undesirable microorganism growth on sorbent media in potable water purification systems. It has been known for many years that the presence of metal ions can be deleterious to the growth and survival of microorganisms, at high enough concentrations. However, it is not desirable to overcome the problem of microorganism contamination by introducing another problem, metal contamination of the potable water.

Although there are no uniform drinking water standards that must be met, the U.S. Environmental Protection Agency ("EPA") has established guidelines for the maximum concentration of certain metals in drinking water. For example, the EPA guideline for copper concentration is 1 ppmw and the EPA guideline for zinc concentration is 5 ppmw. The aforementioned solution of adding metal ions to the water to kill the microorganisms is not an acceptable solution if it in turn renders the water unfit for drinking.

Published PCT application PCT/US86/01996, published Mar. 21, 1987 under Publication Number WO 87/01688, discusses the use of particulate metal, such as brass, for treating water to remove undesirable constituents in water, such as chlorine. The application has as one of its objects the treatment of fluids wherein the fluids are first passed through a conventional fluid treating process such as an activated carbon process and then the fluid is passed through a bed of metal particulate matter to treat undesirable constituents, such as harmful bacteria. When specifically addressing the use of an activated carbon treating medium, the application states that it may be desirable to have the bed of particulate matter downstream of the activated carbon to treat any harmful bacteria contained in the fluid leaving the bed of activated carbon. The reference therefore does not recognize or address the problem solved by the present invention, reduction or inhibition of bacterial growth on the activated carbon itself. Treatment of the effluent from the activated carbon bed will not affect microorganism growth on the bed itself.

Heretofore nothing in the art has taught or suggested that it would be possible to prevent microorganism growth on sorbent media, such as activated carbon, through the introduction of metal ions to the influent water, while maintaining the concentration of such metal ions within acceptable limits for drinking water in the effluent.

SUMMARY OF THE INVENTION

It has now been discovered that through the selective, controlled use of brass particles, it is possible to control or inhibit microorganism growth on sorbents selected from the group consisting of absorbents and adsorbents that are susceptible to undesirable microorganism growth when exposed to water containing such organisms, while not releasing more than 1 ppmw copper ions and 5 ppmw zinc ions into the effluent water, when subjecting the sorbents to a predetermined water flow rate.

The present invention thus provides a method for inhibiting the growth of microorganisms, such as bacteria, on sorbents selected from the group consisting of absorbents and adsorbents that are susceptible to undesirable microorganism growth when exposed to water containing such organisms, said method comprising passing water to be treated by said sorbent over brass particles prior to or concurrently with contacting said sorbent with said water, the contact with the brass particles being sufficient to inhibit the growth of microorganisms on said sorbent while not releasing more than 1 ppmw copper ions and 5 ppmw zinc ions into the effluent water from the filter device.

The present invention also provides an immobilized, composite, sorbent filter element for use in a potable water filtration system, said filter element having increased resistance to microorganism growth, said element comprising from about 95 percent to about 85 percent of at least one sorbent selected from the group consisting of absorbents and adsorbents that are susceptible to undesirable microorganism growth when exposed to water containing such microorganisms, said sorbent being in the form of particles having particle diameters from about 595µ to about 105µ; from about 0.2 percent to about 5 percent of brass particles having particle diameters from about 149µ to about 44µ, the average particle size of the brass particles being from about one-fourth to about four times the average particle size of said sorbent particles; and from about 2 to about 10 percent of a thermally activated binding agent that is present in sufficient quantity to immobilize the sorbent and brass particles in the element, while allowing water to penetrate into and out of said element, the distribution of brass particles being substantially uniform throughout the element; said filter element having a greater resistance to microorganism growth than such an element without said brass particles.

The present invention additionally provides an immobilized, composite, sorbent filter element for use in a potable water filtration system, said filter element having increased resistance to microorganism growth, said element comprising from about 50 percent to about 95 percent of at least one sorbent selected from the group consisting of absorbents and adsorbents that are susceptible to undesirable microorganism growth when exposed to water containing such microorganisms, said sorbent being in the form of particles having particle diameters from about 44$\mu$ to about 18$\mu$; from about 10 percent to about 50 percent of a fibrous component; from about 0.2 percent to about 5 percent of brass particles having particle diameters from about 149$\mu$ to about 44$\mu$, the average particle size of the brass particles being from about one-fourth to about four times the average particle size of said sorbent particles; and a binding agent that is present in sufficient quantity to immobilize the sorbent and brass particles in the element, while allowing water to penetrate into and out of said element, the distribution of brass particles being substantially uniform throughout the element; said filter element having a greater resistance to microorganism growth than such an element without said brass particles.

There is further provided a pretreatment packet for use in a potable water purification system to provide sorbent purification elements with increased resistance to microorganism growth, said packet comprising brass particles preferably having particle diameters from about 149$\mu$ to about 44$\mu$, enclosed by at least one filtration medium that allows water and dissolved zinc and copper ions to penetrate into and out of the packet, but does not allow particulate brass larger than 10$\mu$ to pass out of the packet. Finer or coarser brass particles and corresponding finer or coarser filter packet pore sizes may be used, depending upon the application and system requirements. Although the present invention is concerned with the inhibition of microorganism growth, generally, the microorganisms of principal concern that are controlled through the present invention are those that generate hydrogen sulfide through their metabolism or as a result of their decomposition.

BRIEF DESCRIPTION OF THE DRAWINGS

FIG. 1 is a partial cross-sectional view of a radial flow filtration system, showing the presence of a pretreatment packet in accordance with the present invention.

FIG. 2 is a partial cross-sectional view of a axial flow filtration system, showing the presence of a pretreatment packet in accordance with the present invention.

FIG. 3 is a cross-sectional view of a pretreatment packet in accordance with the present invention.

DESCRIPTION OF THE PREFERRED EMBODIMENTS

In one embodiment, the present invention provides a sorbent purification element in the form of immobilized granular sorbent, preferably granular activated carbon ("GAC") or powdered activated carbon ("PAC"), that has brass particles immobilized in close association with the granular sorbent. There are several recognized methods for making a sorbent bed, such as an adsorbent bed containing GAC. Most typical are axial flow beds and radial flow (hollow core) cartridges. Although some water purification systems employ GAC beds that are simply loose, filled axial flow chambers, such a construction is not desirable for the present invention.

If brass particles are only physically mixed with the GAC, when water flows through the bed, the abrasive nature of the brass particles will cause mutual physical attrition of the brass particles as well as of the GAC, generating undesirable "fines" or small particles that will tend to clog the element and drastically reduce water flow, due to increased resistance caused by the presence of the fines. Further, the attrition may be so severe that the particle size of some of the brass may be reduced to such an extent that the brass particles pass through the purification system and into the user's water supply, undesirably increasing the metal content of the effluent water.

THE SORBENT

Any material capable of sorbing (absorbing or adsorbing) undesirable components from drinking water may be used, provided that the particle size of the sorbent is from about 1680$\mu$ to about 18$\mu$. Preferably the sorbent is granulated or powdered activated carbon such as that available from Haycarb Limited (activated coconut shell carbon), and Calgon Corporation under the designations "WPH" and "PCB". Other useful adsorbent carbons are listed in U.S. Pat. No. 4,664,683 which is incorporated herein by reference.

THE BRASS COMPONENT

As used in this application, the term "brass" means any of the various alloys of copper and zinc that contain said metal in varying proportion. Typically the proportion of copper, by weight, will be from about 50 to about 90 percent, based upon the combined weight of copper and zinc and the proportion of zinc will be from about 10 to about 50 percent on said basis. Preferably, the brass will contain about 85 percent copper an about 15 percent zinc, by weight.

The brass is preferably in the form of particles having particle diameters from about 149$\mu$ to about 44$\mu$. By using particles of such small diameter it is possible to obtain a high rate of metal transfer to the water being processed and in this fashion, minimize the physical size of the particle bed that is necessary to achieve the desired level of copper and zinc concentration in the water. Larger particles result in a slower rate of metal transfer to the water, necessitating a larger, less efficient treatment process.

Other components may be present, but are not necessary and generally are undesirable. Lead, arsenic and cadmium are examples of components that are sometimes present in certain brass alloys. The presence of small quantities of such metals may not be sufficient to degrade water quality, but, in general, it is believed desirable to avoid brass that contains significant amounts of such metals.

The brass alloy known by the designation "KDF-S5F" a trademark of KDF Fluid Treatment, Incorporated, brass is a preferred source of brass for use in the present invention. That brass has a density of 8.76 gram per cc or 0.316 lbs. per cu. in., with a mesh size distribution as follows:

| MESH SIZE RANGE | |
| --- | --- |
| +60 | .2% |
| −60 + 80 | 8% Max |
| −80 + 100 | 8% Max |
| −100 + 200 | 15 to 35% |
| −200 + 325 | 15 to 35% |
| −325 | 55% Max |

Another desirable source of brass for use in the present invention is marketed under the designation 1191 BRASS POWDER by the Zinc Corporation of America, and has the following composition and characteristics:

| Copper | 83.5–86.5% |
| --- | --- |
| Zinc | Remainder, by difference |
| Melting Point | About 1875° F. |
| | Sieve Analysis: |
| +60 mesh | .24 |
| −60 + 80 | 8.0% |
| −80 + 100 | 8.0% |
| −100 + 200 | 15–35% |
| −200 + 325 | 15–35% |
| −325 | 55.0% |

IMMOBILIZED BED ADSORPTION ELEMENTS

It is preferred to immobilize the sorbent, such as GAC, and the brass particles in a form often referred to as "pressed block" carbon beds. Immobilized beds can be bound together with a polymer adhesive (glue), or with a thermoplastic such as Microthene, a polyethylene powder. U.S. Pat. No. 4,664,683 provides a list of useful binding materials for this purpose, said patent being previously incorporated by reference.

The metallic particle size should be close to that of the granule adsorbent to prevent separation or stratification of the materials. The average metal particle size should be no greater than four times the average adsorbent granule size and no smaller than ¼ the average granule size. Preferably, the metal particle size should be no greater than twice the adsorbent average granule size and no less than 50% of the adsorbent average granule size. This is a significant criteria in yielding a homogeneous admixture.

The percentage of metallic additive is dependent upon the quality of the water to be treated. The percentage of metal can vary from 0.2% by weight to as high as 95% by weight. In most water systems, a 0.4% to 5% by weight metal particle addition is sufficient.

The following three (3) known constructions of immobilized carbon beds will be described in greater detail.

1. Radial Flow Pressed Block.

These are made by mixing up a wet slurry of fibrous materials, activated carbon particles, and adhesive; pumping the slurry into a carbon block former (mold); pressing out the free water; removing the pressed block from the former; heating the block in an oven to drive off the moisture; and adding filter materials. To make such a block in accordance with the present invention, brass particles having particle sizes from about 149$\mu$ to about 44$\mu$ are mixed into the slurry prior to the slurry being introduced into the block former.

Many materials can be used for the fibrous structure which gives strength to the pressed block, such as a mixture of cotton linters and fiberglass. The fiberglass fibers usually have a diameter of about ½ micron to one micron and they are intended to prevent compacting, or densification, of the cotton linters. The cotton fibers vary from about 17 microns to about 27 microns in diameter.

Many other materials can be used for the fibrous structure, such as Hercules polyethylene or polypropylene fibrous resins, aramid (such as Kevlar made by Dupont), rayon, nylon and polyesters.

The adhesive resin (glue) must be nontoxic. One useful glue is Rohm and Haas Co. Rhoplex P-310, as well as Rhoplex P-376 which is FDA approved.

Various types of granular and powdered activated carbon can be used, and with various size particles. The mesh size is normally between 12 mesh and 500 mesh. The small granule size helps in improving the mass transfer rate in water systems. Normally, for water treatment, coal base or wood base carbons are used such as Calgon's Type WPH. They provide a wide pore size distribution to enable the adsorption of many types of contaminants. Calgon's Type PCB-G, a 325 mesh × 500 mesh coconut shell carbon is used to obtain improved removal of volatile organic compounds (VOC's). Another possible adsorbent is Barnebey & Sutcliffe Type XZ coconut shell carbon in a 140 by 325 mesh grade, to reduce the pressure loss through the carbon block.

2. Axial Flow Immobilized Bed Water Filter

A typical axial flow water filter is about 2 inches in diameter by about 5 inches long. A useful carbon is made by Sorb-Tech, Inc. and Haycarb Limited and is a 30 mesh by 140 mesh coconut shell carbon, their Type DL-13. The larger particle size is useful because of the low flow cross sectional area of the axial-flow design, to reduce the pressure loss across the bed.

A fine, powdered polyethylene is usually blended in with the carbon, as by using a snow flake filling device to obtain maximum packing density.

The mixture of resin and carbon are heated, normally by a heated air stream flowing through the bed, to "melt" the polymer and join the carbon particles.

Many polymeric resins can be used, such as polyethylene, polypropylene, fluoropolymers (such as Teflon made by DuPont), aramid (such as Kevlar made by Dupont), and others.

To make such a filter in accordance with the present invention, brass particles having particle sizes from about 149$\mu$ to about 44$\mu$ are blended in with the carbon particles prior to the heating step.

3. By impregnated filter log.

A support media, such as filter media, can be "dipped" into successive vats and liquid slurry, and into a single vat to become impregnated with an adsorbent such as activated carbon. The vat may contain an adhesive resin such as Rohm and Haas P-376 polymer.

The wet, impregnated medium is then rolled onto a core to produce a log which is subsequently dried in an oven.

To make such a filter in accordance with the present invention, brass particles having particle sizes from about 149$\mu$ to about 44$\mu$ may be blended in with the slurry of carbon particles or may be present in a separate slurry into which the filter media is dipped prior to the drying step.

PRETREATMENT PACKETS

In accordance with another embodiment of the present invention, a pretreatment packet is made comprising brass particles having particle diameters from about 149μ to about 44μ, enclosed by at least one filtration medium that allows water and dissolved zinc and copper ions to penetrate into and out of the packet, but does not allow particulate brass larger than 10μ to pass out of the packet. Such a packet may be made by any technique recognized in the art. For example, the brass particles may be placed onto a portion of a section of filter medium which is then folded over onto itself and the three open edges bonded together.

The edges may be bonded together as by use of an adhesive, or, if the filter medium includes a heat-bondable layer on the interior portion thereof, the edges may be heat-bonded.

Preferred filter medium is multi-layered and is comprised of glass fiber, a porous polyester substrate and epoxy binder. Such a composite provides both physical strength as well as selective porosity for the packet.

The quantity of brass in each such packet will vary, depending upon the intended application. By way of example, if the packet is to be used in a one gallon per minute water purification system, the packet will typically contain between about 2.5 grams and 10 grams of brass powder. Flow rates of one-half gallon per minute and one liter per minute may also be employed, and treated with such packets containing from about 0.2 to about 2.5 grams of brass powder.

FIG. 3 is a cross-sectional view of a packet 310 made in accordance with the present invention wherein brass particles 318 are enclosed by a top filtration medium layer 312 and a bottom filtration medium layer 314 that is heat-sealed at Junction 316.

By enclosing the brass particles in the filter media, it is possible to severely restrain the movement of the particles, thus reducing physical abrasion of the particles and the resultant generation of undesirable metal fines. Further, in the event that such undesirable small metal particles are produced, the filter media entrains the majority of those particles within the packet. Should the pressure drop through the packet become too large due to the generation of such fines, it is possible to remove the packet and replace the same with another such packet, without the need to change the adsorbent element itself.

In axial flow filtration systems, the brass pretreatment packet should be installed between the carbon bed and the carbon bed support disc. Such an installation is illustrated in FIG. 2 wherein an axial flow system 210 is shown in partial cross-section having an immobilized bed 214 located within housing 212 and supported by an upper support disc 218 and a lower support disc 224. Also illustrated is a post-treatment filtration element 220. The pre-treatment packet 222 is located between the lower support disc 224 and the immobilized carbon bed 214 so that water entering the inlet 216 will pass through the pre-treatment packet 222 prior to entering the carbon bed 214. Placement of the packet in such a location will provide positional stability and good contact with the incoming water.

In FIG. 1 there is illustrated the recommended placement of the pretreatment packet in a radial flow water purification system 110. In FIG. 1 the packet 118 is shown located in the interstitial space 116 between the housing 112 and the adsorbent cartridge 114. This is best handled during installation of a fresh filter cartridge into the system.

It is recommended, especially in cases where hydrogen sulfide odor occurs, that cleaning and sanitization of the water filter assembly be conducted prior to installing a fresh filter cartridge and a brass pretreatment packet.

SINTERED BRASS

In yet another embodiment of the present invention, the brass particles that are used to introduce the metal ions into the water, rather than being enclosed within a packet comprised of filter media, are converted into the form of a sintered brass slug. The particles are placed into a desired shape and then subjected to elevated temperature to cause their adjacent edges to adhere to each other, thus maintaining the individual particle sizes but immobilizing the particles in the given configuration.

While the invention is susceptible to various modifications and alternative forms, certain specific embodiments thereof are described in the examples set forth below. It should be understood, however, that these examples are not intended to limit the invention to the particular forms disclosed, but, on the contrary, the invention is to cover all modifications, equivalents and alternatives falling within the spirit and scope of the invention.

Unless otherwise indicated, all percentages expressed in this application and the appended claims, are percentages by weight.

EXAMPLE 1

Investigation of Axial Flow Element Components

Sorbtech DL-13 activated carbon 30×140 mesh granules were mixed with EXXON LL-6202 (LPX-16) linear low density polyethylene (LLDPE) −70+200 mesh and KDF-85 brass −50+80 mesh powders. Two batches were mixed with the following quantities:

|  | I | II |
| --- | --- | --- |
| Sorbtech DL-13 | 264-g | 231-g |
| EXXON LPX-16 | 26-g | 23-g |
| KDF-85 | 67-g | 58-g |

The mixtures were mixed in 1-liter Pyrex beakers utilizing a 4″-diameter snowflake grinder. Four passes through the snowflake device was sufficient to result in an apparently homogeneous mixture. The top of the mixtures were then examined under a Nikon stereoscope for the presence of brass powder. Only a few particles of brass could be observed on the top surface of the mixtures. Mixture I was then poured into a second 1-liter Pyrex beaker and the top of the mixture was re-examined under the stereoscope. There were a great many brass particles observed on the top surface of mixture I. This indicated that the mixture was not homogeneous. Mixture I was transferred two additional times and the top of the bed appeared to be similar each time. Based on these tests it can be concluded that with reasonable mixing techniques, using the particle sizes for the brass and carbon components in accordance with the present invention, the components may be mixed and will remain mixed, allowing for the production of a uniform immobilized adsorbent element.

EXAMPLE 2

Manufacture of Radial Flow Pressed Block

Radial flow pressed blocks were manufactured using 189.37 pounds of activated carbon (325×400), 105.38 pounds of polyethylene grade ED, 11.53 pounds of fiberglass (106/475) and 4.382 pounds of KDF-S5F brass particles. The adhesive employed was 3.04 pounds of Rohm and Haas P-376. The components were mixed up as a wet slurry of fibrous materials, activated carbon particles, brass particles and adhesive; the slurry was then pumped into a carbon block formers (mold), after which the free water was pressed out. The pressed blocks were then removed from the former, followed by heating of the blocks in an oven to drive off the moisture.

The resultant blocks were analyzed to determine copper and zinc content and distribution. Samples were extracted from the block at various regions beneath the surface. The following results were obtained:

|  | Front | Rear | Ave. |
| --- | --- | --- | --- |
| Top: | 2.124% | 2.029% | 2.077% |
| Middle: | 2.267% | 2.1084 | 2.1874 |
| Bottom: | 2.0294 | 2.267% | 2.148% |
|  |  | Overall Average: | 2.137% |

The overall average of 2.137% indicates a loss of 5% of the brass particles, due mainly to the loss of particles larger than 100 mesh during the pressing operation.

EXAMPLE 3

Manufacture of Radial Flow Pressed Block

Radial flow pressed blocks were manufactured using 3927 grams of activated carbon (140×325), 2184 grams of polyethylene grade ED, 242.5 grams of fiberglass (104/475) and 921 grams of KDF-SSF brass particles. The adhesive employed was 63 grams of Rohm and Haas P-376. The components were mixed up as a wet slurry of fibrous materials, activated carbon particles, brass particles and adhesive; the slurry was then pumped into a carbon block formers (mold), after which the free water was pressed out. The pressed blocks were then removed from the former, followed by heating of the blocks in an oven to drive off the moisture.

The resultant blocks were analyzed to determine copper and zinc content and distribution. Samples were extracted from the block at various regions beneath the surface. The following results were obtained:

|  | Front | Rear | Ave. |
| --- | --- | --- | --- |
| Top: | 16.09% | 20.72% | 18.41% |
| Middle: | 14.83% | 18.514 | 16.67% |
| Bottom: | 18.72% | 17.98% | 18.35% |
|  |  | Overall Average: | 17.81% |

The overall average of 17.81% indicates a loss of 6.3% of the brass particles, due mainly to the loss of particles larger than 100 mesh in the pressing operation.

EXAMPLE 4

Chloroform Challenge of Products of Example 2 (Calgon carbon, polyethylene fibers, 8.2 g KDF-85F)

Two units were each challenged with 300 ppbw chloroform by the injection method, as specified in NSF Standard 53. Both exceeded the useful capacity of 1,000 gallons.

| | Effluent $CHCl_3$ Concentration (ppbw) | | |
| --- | --- | --- | --- |
| Unit | 1000 gal. | 1200 gal. | 1400 gal |
| 1 | 12 | 15 | 20 |
| 2 | 13 | 17 | 32 |

EXAMPLE 5

Copper and Zinc Leachables of Product of Example 2 at Neutral pH

The effluents of the filters of Example 2 were sampled at 100 gallons and 400 gallons, with the results as shown by the following data analyzed for soluble Cu and Zn content by ion chromatography.

| | Concentration of Cu and Zn in Effluent (ppbw) | | | |
| --- | --- | --- | --- | --- |
| | 100 gal. | | 400 gal. | |
| Unit | Cu | Zn | Cu | Zn |
| 1 | 61 | 116 | 60 | 36 |
| 2 | 69 | 127 | 108 | 36 |

EXAMPLE 6

Simulation of Brass Pretreatment Packet

1. Preparation

A column of either acrylic plastic or polyvinyl chloride (approximate dimensions: 130–150 mm × 60–70 mm ID) is packed with one kg (2 pounds) of 20×50 mesh powdered KDFS5-D brass alloy. The bed is supported with either felt or polyester.

Three modules were prepared: to one of the modules a carbon block was connected to the downstream side; to another, a residential filtration system was connected downstream: the remaining module was unmodified as a control. A tee in the effluent line was connected to each of the modules and attached to a 47 mm housing with a 0.45 micron nylon filter disk to trap any eluting particulates.

2. Leach Test

The modules were connected to a filtered tap water source (0.2 micron), supplied at a rate of 1 gallon/minute. Samples were collected in 125 ml particle-free bottles after one minute and ten minutes of operation. The units were then allowed to sit overnight without flow and resampled after 24 hours in the identical manner, as before.

The filters in the 47 mm housings were changed at the ten minute sample collection, air dried and analyzed by XES/SEM. The effluents were analyzed for soluble copper and zinc by ion chromatography.

RESULTS AND DISCUSSION

This experiment was designed to simulate the use of a brass pretreatment packet, installed in conjunction with a residential water filtration system, and under conditions which may be considered to be typical. In actual use, the system may be expected to be turned on and off at staggered intervals and for varying lengths of time; it may be allowed to stand overnight and started up the next day without an initial flushout.

The results of the leach testing of the brass are shown in Table 1. The brass decreased the concentration of dissolved copper from solution during the course of the two day test.

The brass showed a substantial increase in the amount of dissolved zinc relative to the input levels. The module alone was found to increase the amount of dissolved zinc by a factor of about 40-fold from 72.1 ppbw to 2.4 ppmw after 10 minutes of operation. In combination with either the carbon block or the complete filter assembly, the levels were substantially reduced, to 506.8 and 280.0 ppbw, respectively, after 10 minutes. However, in operation on the next day the levels of dissolved zinc eluting from the module, the module/carbon block and the module/complete filter assembly combination were found to range in the low parts per million, compared to an influent level of about 94 ppbw. The effluent from the module combined with either the carbon block or the complete filter initially showed about double the input level of dissolved zinc (230.4 and 147.8 ppbw, respectively). However, after 10 minutes of operation, both combinations show effluent zinc concentrations comparable to the effluent from the module itself, in the low parts per million.

From these data, it appears that the brass has some inherent capacity to reduce the concentration of dissolved copper in water. However, the concentration of zinc increases in concentration. One possible explanation is that the brass acts as a redox couple, wherein dissolved copper is plated out of solution and zinc is simultaneously solubilized.

The results of the test conducted to determine the extent of leaching of copper and zinc from the brass alloy showed that copper is reduced in solution by contact with the alloy, however, with a concomitant increase in the amount of dissolved zinc.

minating flow via a downstream valve. Effluents were sampled at initiation of flow, 5 gallons, 400 gallons, and at initiation of flow the next morning. The data are as follows:

| pH 5 | | | Effluent levels (ppbw) | |
|---|---|---|---|---|
| Ion | start-up | 5 gal. | 400 gal. | next day start-up |
| Cu | <DL | 23 | 124 | 96 |
| Zn | <DL | <DL | 46 | 1500 |

| pH 6.5 | | | Effluent levels (ppbw) | |
|---|---|---|---|---|
| Ion | start-up | 5 gal. | 400 gal. | next day start-up |
| Cu | <DL | <DL | 16 | 12 |
| Zn | <DL | <DL | 56 | 804 |

| pH 10 | | | Effluent levels (ppbw) | |
|---|---|---|---|---|
| Ion | start-up | 5 gal. | 400 gal. | next day start-up |
| Cu | <DL | 13 | 30 | 53 |
| Zn | <DL | <DL | <DL | 159 |

The combination of the brass pre-treatment and the carbon bed was therefore operating with Cu and Zn levels in the effluent below EPA guidelines of 1 ppmw Cu and 5 ppmw Zn, at pH levels from 5–10.

EXAMPLE 9

TABLE 1

TIME COMPARISON OF THE CONCENTRATION OF DISSOLVED COPPER AND ZINC LEACHED FROM BRASS ALLOY (PARTS PER BILLION)

| ION | INLET CONTROL | MODULE 1 MIN | MODULE 10 MIN | BRASS + CARBON BLOCK 1 MIN | BRASS + CARBON BLOCK 10 MIN | BRASS + FILTER ASSEMBLY 1 MIN | BRASS + FILTER ASSEMBLY 10 MIN |
|---|---|---|---|---|---|---|---|
| DAY 1: | | | | | | | |
| Cu | 277.0 | 149.2 | 157.3 | <DL | 40.3 | 32.4 | 17.0 |
| Zn | 72.1 | $2.9 \times 10^3$ | $2.4 \times 10^3$ | <DL | 506.8 | 186.3 | 280.0 |
| DAY 2: | | | | | | | |
| Cu | 360.6 | 70.6 | 71.4 | 17.9 | 7.9 | <DL | 277.0 |
| Zn | 93.8 | $3.3 \times 10^3$ | $2.5 \times 10^3$ | 230.4 | $2.0 \times 10^3$ | 147.8 | $1.1 \times 10^3$ |

EXAMPLE 7

Brass Pretreatment Packets

Pretreatment packets were made using either 5 or 10 grams of KDF-85 brass particles per packet. The brass particles were enclosed by a filter medium comprised of glass fiber, polyester substrate and epoxy binder. The brass particles were placed on a section of the medium which was then folded over onto itself and bonded at the peripheral edges by heating sealing.

EXAMPLE 8

Testing of Brass Pretreatment Packets

A product of Example 7, containing 5 grams of brass, was installed in a residential water filtration apparatus at the inlet port, as illustrated in FIG. 1. Standard activated carbon filters were used in the filtration apparatus.

Tests were performed at pH 5, 6.5, and 10 by flowing water at 1 gpm for 400 gallons, turning off the flow overnight, and initiating flow the next morning. Pressure was maintained on the cartridge overnight by terminating flow via a downstream valve.

Testing Of Brass Pretreatment Packets

Two products of Example 7, containing 10 grams of brass, were installed at the inlet port of a standard residential water filtration apparatus to evaluate copper and zinc leachables with a total of 20 grams of brass. The testing was performed at pH 5 and 6.5, with effluent sampled at start-up and at 400 gallons (except pH 5 day 1, at 180 gallons) for three days. The system was pressurized overnight each day. A flow of 1 gpm was used.

| pH 5 Test - Effluent Levels (ppbw) | | | | | |
|---|---|---|---|---|---|
| Day 1 Start-up | 180 gal. | Day 2 Start-up | 400 gal. | Day 3 Start-up | 400 gal. |
| Cu <2 | 8 | 30 | 238 | 66 | 127 |
| Zn <10 | 61 | 1039 | 128 | 1467 | 36 |

| pH 6.5 Test - Effluent Levels (ppbw) | | | | | |
| --- | --- | --- | --- | --- | --- |
| Day 1 Start-up | 400 gal. | Day 2 Start-up | 400 gal. | Day 3 Start-up | 400 gal. |
| Cu  14 | 23 | 14 | 41 | 32 | 134 |
| Zn 110 | 40 | 71 | 39 | 1316 | 31 |

All measured Cu and Zn levels were below the EPA guideline of less than 1 ppmw Cu and 5 ppmw Zn.

EXAMPLE 10

Effect of the Device on Desulfevbrio desulfuricans in laboratory test

Desulfovibrio desulfuricans is well known for the ability to produce hydrogen sulfide in nature and under laboratory conditions, and is one of the main causative agents in the production of hydrogen sulfide in water supplies.

Laboratory cultures of *D.desulfuricans* were inoculated into 100 mL of a synthetic broth which permits both the growth of the bacteria and the detection of sulfide in the form of ferrous sulfide, a black compound which forms in the clear broth through the reaction of ferrous ammonium sulfate with hydrogen sulfide.

Test cultures included:
1. Control—no brass powder
2. Test #1—2.5 grams brass powder in a pretreatment packet made in accordance with the procedure of Example 7
3. Test #2—10 grams brass powder in a pre-treatment packet made in accordance with Example 7

All cultures were incubated at 37° C. for three days. The control culture turned uniformly black. Test cultures 1 and 2 did not turn black confirming that the device has an effect on the bacteriological system.

EXAMPLE 11

Evaluation of the Device in water Filter Units in Laboratory Test

Standard water filter purification units were installed on an in-house well water system. To simulate conditions where bacterial production of hydrogen sulfide is prevalent, a dilute suspension of *D. desulfuricans* was injected into the flowing systems throughout the tests. The test system was cycled on and off several times each day to simulate actual household use with flowing and stagnant (non-flowing) conditions.

Test units included:
1. Control—Axial Flow Element—no brass powder
2. Device—Axial Flow Element—with brass-powder in a carbon block made in accordance with the method of Example 1
3. Control—Radial Flow Block—no brass powder
4. Device—Radial Flow Block—with brass powder in carbon block made in accordance with the method of Example 2
5. Device—Radial Flow—with brass powder (10 g) in a pre-treatment packet made in accordance with the method of Example 7

Water samples were taken daily and evaluated for odors (organic sulfur compounds and hydrogen sulfide). All control filter devices began producing unpleasant odors, including hydrogen sulfide (rotten egg odor) within 5 to 20 days. All devices containing the brass powder remained free of unpleasant organic and hydrogen sulfide odors for the duration of the tests which ranged from 30 to 40 days.

These results confirm the bacteriological odor control properties of the device both as incorporated into the carbon block, and as a separate pre-treatment package inserted upstream of the carbon containing filter unit.

EXAMPLE 12

Field Evaluation of the Effectiveness of the Device

Field potable water locations known to be subject to hydrogen sulfide production when water purification devices were on-line were selected for the test. The "rotten egg" odor was, in all cases, reported as occurring within 2 to 12 weeks after installation of a purification device.

New water purification filters used with the brass pre-treatment packets or containing the brass powder integrated into the carbon block, in accordance with the present invention, were installed at selected test sites.

All field test units produced hydrogen sulfide odor-free water for service periods at least two to three times the prior service life of filter units which did not employ the brass powder. In some cases the hydrogen sulfide odor was prevented for the full filter unit service life.

The test results confirm the effectiveness of the device in actual field service applications.

What is claimed is:

1. An immobilized, composite, sorbent purification element for use in a potable water purification system, said element having increased resistance to microorganism growth, said element comprising (a) from about 50 percent to about 95 percent of at least one sorbent selected from the group consisting of absorbents and adsorbents in the form of particles of granulated or powdered activated carbon, having particle diameters from about 44 $\mu$ to about 18 $\mu$; (b) from about 10 to about 50 percent of a fibrous component; (c) from about 0.2 percent to about 5 percent of brass particles having particle diameters from about 149 $\mu$ to about 44 $\mu$, the average particle size of the brass particles being from about one-fourth to about four times the average particle size of said sorbent particles; and (d) from about 0.5 to about 2 percent of a binding agent that is present in sufficient quantity to immobilize the sorbent and brass particles in the element, while allowing water to penetrate into and out of said element; with the distribution of brass particles being substantially uniform throughout the element; and said element having a greater resistance to microorganism growth than such an element without said brass particles.

2. The immobilized, composite, sorbent purification element of claim 1, wherein said element is of a construction which allows a fluid to flow radially therethrough.

3. The immobilized, composite, sorbent purification element of claim 2, wherein said element is prepared by (a) preparing an aqueous slurry comprising said fibrous component, said particles of granulated or powdered activated carbon, said brass particles, and said binding agent, (b) placing said slurry into a carbon block mold, (c) removing any free water to produce a moist block, (d) removing said moist block from said mold, and (e) heating said block to remove moisture.

4. The immobilized, composite, sorbent purification element of claim 1, wherein said fibrous component is selected from the group consisting of fiberglass, cotton, polyethylene, polypropylene, aramid, rayon, nylon, and polyesters.

5. The immobilized, composite, sorbent purification element of claim 4, wherein said binding agent is an adhesive resin.

6. The immobilized, composite, sorbent purification element of claim 5, wherein said activated carbon is a wood base, coal base, or a coconut shell base carbon.

7. A filter packet comprising the immobilized, composite, sorbent purification element of claim 1 and a filter medium that allows water and dissolved zinc and copper ions to penetrate through said filter medium, wherein said filter medium surrounds said immobilized, composite, sorbent purification element.

8. The filter packet of claim 7, wherein said filter medium is multi-layered and is comprised of glass fiber, a porous polyester substrate, and epoxy binder.

9. The filter packet of claim 7, wherein said binding agent is an adhesive resin.

10. The filter packet of claim 9, wherein said activated carbon is a wood base, coal base, or a coconut shell base carbon.

11. The filter packet of claim 7, wherein said filter packet does not release more than 1 ppmw copper ions and 5 ppmw zinc ions into the effluent water, when subjected to a predetermined water flow rate of one liter per minute.

12. The filter packet of claim 11, wherein said filter packet does not release more than 1 ppmw copper ions and 5 ppmw zinc ions into the effluent water, when subjected to a predetermined water flow rate of one-half gallon per minute.

13. The filter packet of claim 12, wherein said filter packet does not release more than 1 ppmw copper ions and 5 ppmw zinc ions into the effluent water, when subjected to a predetermined water flow rate of one gallon per minute.

14. A method of purifying contaminated water comprising contacting said contaminated water with the immobilized, composite, sorbent purification element of claim 1.

15. An immobilized, composite, sorbent purification element for use in a potable water filtration system, said element having increased resistance to microorganism growth, said element comprising (a) from about 85 percent to about 95 percent of at least one sorbent selected from the group consisting of absorbents and adsorbents in the form of particles of granulated or powdered activated carbon, having particle diameters from about 595 $\mu$ to about 105 $\mu$; (b) from about 0.2 percent to about 5 percent of brass particles having particle diameters from about 149 $\mu$ to about 44 $\mu$, the average particle size of the brass particles being from abut one-fourth to about four times the average particle size of said sorbent particles; and (c) from about 2 to about 10 percent of a thermally activated binding agent that is present in sufficient quantity to immobilize the sorbent and brass particles in the element, while allowing water to penetrate into and out of said element; with the distribution of brass particles being substantially uniform throughout the element; and said element having a greater resistance to microorganism growth than such an element without said brass particles.

16. The immobilized, composite, sorbent purification element of claim 15, wherein said element is of a construction which allows a fluid to flow axially therethrough.

17. The immobilized, composite, sorbent purification element of claim 16, wherein said element is prepared by (a) blending a finely powdered polymeric resin, activated carbon particles, and brass particles to obtain a uniform mixture, and (b) heating said mixture to melt said polymeric resin and join said carbon particles.

18. The immobilized, composite, sorbent purification element of claim 15, wherein said activated carbon is a coconut shell carbon.

19. The immobilized, composite, sorbent purification element of claim 18, wherein said binding agent is a polymeric resin selected from the group consisting of polyethylene, polypropylene, fluoropolymer, and aramid.

20. The immobilized, composite, sorbent purification element of claim 15, wherein said element further comprises a filter medium impregnated with said sorbent, said brass particles, and said binding agent.

21. The immobilized, composite, sorbent purification element of claim 20, wherein said element is prepared by (a) successively contacting a filter medium with said binding agent and a liquid slurry containing said activated carbon particles and said brass particles to produce a wet impregnated filter medium, and (b) configuring said wet impregnated filter medium onto a core to produce a log which is subsequently dried.

22. The immobilized, composite, sorbent purification element of claim 21, wherein said binding agent is an adhesive resin.

23. The immobilized, composite, sorbent purification element of claim 20, wherein said element is prepared by (a) successively contacting a filter medium with said binding agent, a liquid slurry containing said activated carbon particles, and a liquid slurry containing said brass particles to produce a wet impregnated filter medium, and (b) configuring said wet impregnated filter medium onto a core to produce a log which is subsequently dried.

24. The immobilized, composite, sorbent purification element of claim 23, wherein said binding agent is an adhesive resin.

25. A filter packet comprising the immobilized, composite, sorbent purification element of claim 15 and a filter medium that allows water and dissolved zinc and copper ions to penetrate through said filter medium, wherein said filter medium surrounds said immobilized, composite, sorbent purification element.

26. The filter packet of claim 25, wherein said filter medium is multi-layered and is comprised of glass fiber, a porous polyester substrate, and epoxy binder.

27. The filter packet of claim 25, wherein said binding agent is an adhesive resin.

28. The filter packet of claim 27, wherein said activated carbon is a wood base, coal base, or a coconut shell base carbon.

29. The filter packet of claim 25, wherein said filter packet does not release more than 1 ppmw copper ions and 5 ppmw zinc ions into the effluent water, when subjected to a predetermined water flow rate of one liter per minute.

30. The filter packet of claim 29, wherein said filter packet does not release more than 1 ppmw copper ions and 5 ppmw zinc ions into the effluent water, when subjected to a predetermined water flow rate of one-half gallon per minute.

31. The filter packet of claim 30, wherein said filter packet does not release more than 1 ppmw copper ions and 5 ppmw zinc ions into the effluent water, when subjected to a predetermined water flow rate of one gallon per minute.

32. A method of purifying contaminated water comprising contacting said contaminated water with the immobilized, composite, sorbent purification element of claim 15.

* * * * *

UNITED STATES PATENT AND TRADEMARK OFFICE
CERTIFICATE OF CORRECTION

PATENT NO. : 5,443,735

DATED : AUGUST 22, 1995

INVENTOR(S) : DONALD H. WHITE, JR.

Page 1 of 2

It is certified that error appears in the above-identified patent and that said Letters Patent is hereby corrected as shown below:

ON THE TITLE PAGE:

[75] Inventors: delete first inventor "Erwin Kirnbauer, Lattingtown";

delete "both of" on second line, and delete third inventor, city and state, "Joseph D. Adiletta, Thompson, Conn.".

Column 4, line 42, "an" should read -- and --;

Column 4, lines 63-64, ""KDF-S5F"" should read -- "KDF-85F" --;

Column 5, second table, under heading of "Sieve Analysis:" first line, delete ".24" and substitute therefor -- .2% --;

Column 7, line 31, "Junction" should read -- junction --;

Column 9, line 1, "KDF-S5F" should read -- KDF-85F --;

Column 9, first table, last line under "Front", "2.0294" should read -- 2.029% --;

Column 9, first table, second line under "Rear", "2.1084" should read -- 2.108% --;

UNITED STATES PATENT AND TRADEMARK OFFICE
CERTIFICATE OF CORRECTION

PATENT NO. : 5,443,735

DATED : AUGUST 22, 1995

INVENTOR(S) : DONALD H. WHITE, JR.

It is certified that error appears in the above-identified patent and that said Letters Patent is hereby corrected as shown below:

Column 9, first table, second line under "Ave.", "2.1874" should read -- 2.187% --;

Column 9, line 34, "KDF-SSF" should read -- KDF-85F --;

Column 9, second table, second line under "Rear", "18.514" should read -- 18.51% --;

Column 10, line 28, "1. Preparation" should read -- 1. Module Preparation --;

Column 10, line 32, "KDFS5-D" should read -- KDF85-D --; and

Column 13, line 12, "Desulfevbrio" should read -- Desulfevibrio --.

Column 15, line 51, "abut" should read -- about --.

Signed and Sealed this

Second Day of January, 1996

BRUCE LEHMAN

*Attest:*

*Attesting Officer*   *Commissioner of Patents and Trademarks*